(12) United States Patent
Sheard et al.

(10) Patent No.: US 7,353,132 B2
(45) Date of Patent: Apr. 1, 2008

(54) DATA ACQUISITION SYSTEM

(75) Inventors: Stuart Nicholas Sheard, Wilston (AU);
Peter Allan Rowston, Rainworth (AU);
Terry John Ritchie, Indooroopilly (AU)

(73) Assignee: Xstrata Copper Exploration Pty Ltd, Spring Hill (AU)

( * ) Notice: Subject to any disclaimer, the term of this patent is extended or adjusted under 35 U.S.C. 154(b) by 312 days.

(21) Appl. No.: 09/985,668

(22) Filed: Nov. 5, 2001

(65) Prior Publication Data

US 2003/0040882 A1 Feb. 27, 2003

(30) Foreign Application Priority Data

Aug. 23, 2001 (AU) .................................. PR 7232

(51) Int. Cl.
*G06F 15/00* (2006.01)

(52) U.S. Cl. ..................................... 702/127

(58) Field of Classification Search ................ 702/127, 702/14, 17, 11, 77, 85, 108; 175/40; 367/82, 367/77, 78, 38, 56, 25, 21, 42, 4; 342/22; 361/796; 340/856; 701/50; 356/73; 324/334; 73/1; 374/1
See application file for complete search history.

(56) References Cited

U.S. PATENT DOCUMENTS

| 4,339,720 | A |   | 7/1982  | Halverson              |
|-----------|---|---|---------|------------------------|
| 5,276,655 | A |   | 1/1994  | Rialan et al. ... 367/77 |
| 5,444,374 | A | * | 8/1995  | Stanley et al. ... 324/334 |
| 5,550,787 | A |   | 8/1996  | Rialan et al. ... 367/77 |
| 5,724,241 | A |   | 3/1998  | Wood et al. ... 702/14  |
| 5,978,313 | A |   | 11/1999 | Longaker ... 367/38     |
| 6,122,042 | A | * | 9/2000  | Wunderman et al. ... 356/73 |
| 6,191,587 | B1|   | 2/2001  | Fox et al.              |

FOREIGN PATENT DOCUMENTS

AU             9958341        *   5/2000

OTHER PUBLICATIONS

Electronic Devices and Circuits, Theodore F. Bogart, Jr., Merrill Publishing Company 1986, p. 645.*
http://www.crownaudio.com/apps_htm/designtools/ohms-law.htm, p. 1.*
Gamble, T.D., et al., Geophysics, vol. 44, Issue 5, pp. 959-968 (May 1979).
Copy of relevant page of Chillan Search Report for Application No. 2441-2001.

* cited by examiner

*Primary Examiner*—Tung S. Lau
(74) *Attorney, Agent, or Firm*—Pearne & Gordon LLP (57) ABSTRACT

An induced polarization (IP) data acquisition system includes a plurality of linearly spaced apart measurement nodes or obtaining synchronized measurement signals indicative of the electric field strength at a corresponding plurality of spaced apart locations at or adjacent to a surface of a first geological body. A reference node obtains reference signals indicative of the magnetic field strength at a location at or adjacent to a surface of a second geological body that is spaced apart from body. The reference signals are synchronized with the measurement signals. A processing center is responsive to the measurement signals and the reference signals for deriving a transfer function for body. System is configured for deriving survey data that is indicative of one or more geophysical properties of a body and use is made of the transfer function referred to above to more accurately derive the survey data. That is, processing center, which takes the form of a local desktop computer, is responsive to the measurement signals and the reference signals for deriving the survey data.

20 Claims, 8 Drawing Sheets

DATA ACQUISITION SYSTEM

BACKGROUND TO THE INVENTION

The present invention relates to a data acquisition system.

The invention has been developed primarily for induced polarisation (IP) geophysical surveys utilising controlled sources and natural sources for identifying metalliferous regions within a geological body, and will be described herein after with reference to that application. However, it will be appreciated that the invention is not limited to this particular field of use and is also applicable to other geological, geophysical, geotechnical, environmental and other surveys.

DISCUSSION OF THE PRIOR ART

The purpose of exploration geophysics is to produce images of sub-surface physical properties. The value of the images and other analysis produced and manifested is dictated by the available spatial resolution and the property accuracy at all points. While this information can also be used to surmise or interpret chemistry and rock type, this is of secondary importance since such interpretations will be limited to the accuracy of the physical property image.

Particularly in the field of mineral exploration it has been known to gather data indicative of the geophysical properties of a body of earth by injecting a large square wave current into the surface of that body and measuring one of a number of parameters. It has also been known to measure the parameters with a plurality of interconnected transducers disposed at a respective plurality of spaced apart locations, usually in a linear array, across the surface of the body. Given the size of the bodies under investigation it is easily appreciated that the logistic of setting up for and performing a survey are immense and, accordingly, expensive both in terms of capital and labour costs.

Most existing systems are prone to error due to noise levels inherent in the mode of measurement that occurs. This error is sometimes such that it renders useless the entire data set gathered in respect of a survey of a given body. However, due to the mode of data capture and the quantity of data gathered, the processing of that data does not occur for some time and usually not until the survey hardware has been collected and moved to another location.

In answer to this limitation, the prior art systems gather large amounts of data over a large time period. This, however, is even more time consuming and results in even greater delays before any results can be obtained due to the greater amount of data processing that is required. It also has the effect of increasing the cost of the hardware involved.

The present applicant developed a geological data acquisition system that utilises synchronisation between an input current signal that is injected into the body and the measured output signals to provide for better noise cancellation properties. Accordingly, the risk of the data being corrupted is reduced. This system is described in Australian Patent Application no 58341/99, the disclosure in which is incorporated herein by way of cross-reference.

It has also been known to utilise a psuedo-remote referencing system for geological surveys. That is, the survey data is collected from the body under investigation, in accordance with existing methods, to provide an initial survey result. In addition, one or more sensors are disposed adjacent to, but theoretically not part of, the array associated with the body. The data gained from these additional sensors is obtained in synchronism with the other measurements to allow the calculation of a correction factor that is applied to the initial result. These sensors are often located, albeit unknowingly, too close to the body under investigation and the correction made is corrupted due to the presence of the input current signal in what was intended to be remotely collected data. Therefore, prior systems of this kind are notoriously unreliable, are of limited effectiveness and the validity of the calculated correction is highly questionable. As a result, this form of survey is rarely used.

Moreover, any source of noise does not necessarily give rise to a simultaneous effect at the local and the remote measurement sites. Accordingly, the correction referred to above, when applied to the results, often adds to the noise rather than reducing it.

Any discussion of the prior art throughout the specification should in no way be considered as an admission that such prior art is widely known or forms part of common general knowledge in the field.

DISCLOSURE OF THE INVENTION

It is an object of the present invention to overcome or ameliorate at least one of the disadvantages of the prior art, or to provide a useful alternative.

According to a first aspect of the invention there is provided an induced polarisation (IP) data acquisition system, the system including:

a first plurality of measurement nodes for obtaining synchronised measurement signals indicative of the electric field strength at a corresponding plurality of spaced apart locations at or adjacent to a surface of a first geological body;

a reference node for obtaining reference signals indicative of the magnetic field strength at a location at or adjacent to a surface of a second geological body that is spaced apart from the first geological body, wherein the reference signals are synchronised with the measurement signals; and a processing centre being responsive to the measurement signals and the reference signals for deriving a transfer function for the first body.

Preferably, the transfer function is proportional to the measurement signals and inversely proportional to the reference signals. More preferably, the measurement signals are taken along a substantially horizontal first axis and the reference signals are taken along a substantially horizontal second axis, where the first axis is normal to the second axis. Even more preferably, the transfer function is frequency dependent and the measurement signals are representative of electric field strength and the reference signals are representative of magnetic field strength.

Preferably also, the transfer function is used to determine a predicted noise signal at the local site. More preferably, the predicted noise signal is determined by applying the transfer function to measurement signals and reference signals that are subsequently obtained in the presence of a current signal in the first geological body, where the predicted noise signal is subtracted from those subsequent measurement signals to provide corrected measurement signals. That is, there are two sets of measurement signals and two corresponding sets of reference signals. The first sets are used to determine the transfer function, and these are collected in the absence of a current signal in the first body. The second set, on the other hand, are obtained later an in the presence of the current signal.

Preferably, the transfer function is calculated for each of the measurement nodes. However, in other embodiments, the transfer function is calculated for the first body as a whole. More preferably, there are a plurality of spaced apart measurement nodes.

According to a second aspect of the invention there is provided a method of acquiring induced polarisation (IP) data, the method including:

obtaining synchronised measurement signals indicative of the electric field strength at a corresponding plurality of spaced apart locations at or adjacent to a surface of a first geological body;

obtaining reference signals indicative of the magnetic field strength at a location at or adjacent to a surface of a second geological body that is spaced apart from the first geological body, wherein the reference signals are synchronised with the measurement signals; and being responsive to the measurement signals and the reference signals for deriving a transfer function for the first body.

According to a third aspect of the invention there is provided a data acquisition system for deriving survey data that is indicative of one or more geophysical properties of a first geological body, the system including:

a plurality of measurement nodes for obtaining synchronised measurement signals indicative of predetermined first characteristics of the body at a corresponding plurality of spaced apart locations at or adjacent to a surface of the first body;

a reference node for obtaining reference signals indicative of one or more predetermined second characteristics of a second geological body that is spaced apart from the first geological body, the second node being disposed at or adjacent to a surface of the second body and the reference signals being synchronised with the measurement signals; and a processing centre being responsive to the measurement signals and the reference signals for deriving the survey data.

Preferably, the measurement nodes each include a transducer for providing the measurement signal and a sampling circuit and memory for respectively sampling and storing the measurement signal. More preferably, each measurement node includes a transmitter for allowing that node to communicate with at least one adjacent node to transfer the stored measurement signal to the processing centre. That is, the nodes are connected in series so that the information contained within the node furthest from the processing centre is transferred through all intervening nodes prior to being received by the processing centre. However, in other embodiments, the nodes are connected in parallel and each node communicates directly with the processing centre.

Preferably also, each measurement node is linked to at least one adjacent node by an electrical cable. However, in other embodiments, each transmitter is a wireless transmitter and each node includes a corresponding receiver. That is, this wireless link is analogous to the serial connection referred to above. In other embodiments, the processing centre includes a receiver that is responsive to the transmitter at each node, that is, analogous to a parallel connection of the nodes and the processing centre.

In a preferred form, the system includes a plurality of reference nodes that are arranged in an array that is similarly configured to the array of measurement nodes. More preferably, the first plurality is greater than the second plurality.

Preferably, each sampling circuit obtains a plurality of time spaced apart samples of the first signal. More preferably, these spaced apart samples are synchronised with the sampling of the reference signals. Even more preferably, the memory stores data indicative both of the sampled first signals and the timing of the sample. This latter feature is referred to as "time stamping".

Preferably, the first and the second characteristics are different. For example, in some embodiments, an input signal is applied to the first body and the first characteristic is the respective voltage at the first nodes that has been induced by the applied signal and the second characteristic is the magnetic field strength at one or more of the second nodes. In other embodiments, however, the first and the second characteristic are the same.

According to a fourth aspect of the invention there is provided a method for deriving survey data that is indicative of one or more geophysical properties of a first geological body, the method including:

synchronously obtaining, with a plurality of measurement nodes, respective measurement signals indicative of predetermined characteristics of the body at a corresponding plurality of spaced apart locations at or adjacent to a surface of the first body;

obtaining, with a reference node, reference signals indicative of predetermined characteristics of a second geological body that is spaced apart from the first geological body, the second node being disposed at or adjacent to a surface of the second body and the reference signals being synchronised with the measurement signals; and being responsive to the measurement signals and the reference signals for deriving the survey data.

According to a fifth aspect of the invention there is provided a data acquisition system for deriving survey data that is indicative of one or more geophysical properties of a first geological body, the system including:

a plurality of measurement nodes for obtaining respective measurement signals indicative of predetermined characteristics of the body at a corresponding plurality of spaced apart locations at or adjacent to a surface of the first body;

a reference node for obtaining reference signals indicative of predetermined characteristics of a second geological body that is spaced apart from the first geological body, the second node being disposed at or adjacent to a surface of the second body;

a transmitter being responsive to one of the measurement signals and the reference signals for transmitting a wireless signal;

a processing centre being responsive to the wireless signal and the other of the measurement signals and the reference signals for deriving the survey data.

Preferably, the measurement signals and the reference signals are digital signals. More preferably, the measurement signals and the reference signals are synchronised with each other. More preferably, the measurement signals from each of the first nodes are synchronised with each other. Even more preferably, there are a plurality of spaced apart second nodes for providing respective reference signals that are synchronised with each other.

Preferably also, one or more of the reference signals and one or more of the measurement signals includes respective magnetotelluric data and the processing centre is responsive to the to magnetotelluric data to reduce the effect of non-plane wave noise sources on the survey data.

According to a sixth aspect of the invention there is provided a method for deriving survey data that is indicative of one or more geophysical properties of a first geological body, the system including:

obtaining, with a plurality of measurement nodes, respective measurement signals indicative of predetermined characteristics of the first body at a corresponding plurality of spaced apart locations at or adjacent to a surface of the first body;

obtaining, with a reference node, reference signals representative of predetermined characteristics of a second geological body that is spaced apart from the first geological body, the second node being disposed at or adjacent to a surface of the second body;

being responsive to one of the measurement signals and the reference signals for transmitting a wireless signal;

being responsive to the wireless signal and the other of the measurement signals and the reference signals for deriving the survey data.

According to a seventh aspect of the invention there is provided a data acquisition system for deriving survey data that is indicative of one or more geophysical properties of a first geological body, the system including:

a first plurality of measurement nodes for obtaining respective measurement signals indicative of predetermined characteristics of the body at a corresponding plurality of spaced apart locations at or adjacent to a surface of the first body;

a reference node for obtaining reference signals representative of predetermined characteristics of a second geological body that is spaced apart from the first geological body, the second node being disposed at or adjacent to a surface of the second body; and a processing centre being responsive to the measurement signals and the reference signals for deriving the survey data in real time.

According to an eighth aspect of the invention there is provided a method for deriving survey data that is indicative of one or more geophysical properties of a first geological body, the method including:

obtaining, with a first plurality of measurement nodes, respective measurement signals indicative of predetermined characteristics of the body at a corresponding plurality of spaced apart locations at or adjacent to a surface of the first body;

obtaining, with a reference node, reference signals indicative of predetermined characteristics of a second geological body that is spaced apart from the first geological body, the second node being disposed at or adjacent to a surface of the second body; and being responsive to the measurement signals and the reference signals for deriving the survey data in real time.

According to a ninth aspect of the invention there is provided a data acquisition system for deriving survey data that is indicative of one or more geophysical properties of a first geological body, the system including:

a first plurality of measurement nodes for synchronously obtaining respective measurement signals indicative of predetermined characteristics of the body at a corresponding plurality of spaced apart locations at or adjacent to a surface of the first body, wherein the predetermined characteristics include one or more of: the electric field strength at the node along one or more axes; the magnetic field strength at the node along one or more axes; the voltage at the node relative to a given datum;

a reference node being disposed at or adjacent to a surface of a second body for obtaining reference signals indicative of the magnetic field strength at that node along at least one axis, wherein the second body is spaced apart from the first body and the reference signals are synchronised with the measurement signals; and a processing centre being responsive to the measurement signals and the reference signals for deriving the survey data.

According to a tenth aspect of the invention there is provided a method for deriving survey data that is indicative of one or more geophysical properties of a first geological body, the method including:

synchronously obtaining, with a plurality of measurement nodes, respective measurement signals indicative of predetermined characteristics of the body at a corresponding plurality of spaced apart locations at or adjacent to a surface of the first body, wherein the predetermined characteristics include one or more of: the electric field strength at the node along one or more axes; the magnetic field strength at the node along one or more axes; the voltage at the node relative to a given datum;

disposing a reference node at or adjacent to a surface of a second body for obtaining reference signals indicative of the magnetic field strength at that node along at least one axis, wherein the second body is spaced apart from the first body and the reference signals are synchronised with the measurement signals; and being responsive to the measurement signals and the reference signals for deriving the survey data.

According to an eleventh aspect of the invention there is provided a data acquisition system for deriving induced polarisation (IP) survey data that is indicative of one or more geophysical properties of a geological body, the system including:

a plurality of nodes for obtaining respective signals indicative of the electric and magnetic field strength at a corresponding plurality of spaced apart locations at or adjacent to a surface of the body;

a processing centre being responsive to the signals and a predetermined transfer function for deriving the survey data.

According to a twelfth aspect of the invention there is provided a method for deriving induced polarisation (IP) survey data that is indicative of one or more geophysical properties of a geological body, the method including:

obtaining signals, with a plurality of respective nodes, indicative of the electric and magnetic field strength at a corresponding plurality of spaced apart locations at or adjacent to a surface of the body;

being responsive to the signals and a predetermined transfer function for deriving the survey data.

According to a thirteenth aspect of the invention there is provided a data acquisition system for deriving survey data that is indicative of one or more geophysical properties of a geological body, the system including:

a first array of measurement nodes that are spaced apart across a surface of the body for providing first measurement signals indicative of one or more predetermined characteristics of the body;

a second array of measurement nodes that are spaced apart across the surface of the body, the second array being disposed adjacent to the first array for providing second measurement signals indicative of one or more predetermined characteristics of the body;

a reference current electrode being disposed in the body;

a moveable current electrode that is placed in the body sequentially between the nodes in the first array to provide respective input currents in the body that flow between the electrodes; and a processing centre being responsive to the measurement signals during the provision of the input currents for determining the survey data.

Preferably, the first array and the second array are linear and parallel. That is, the measurement nodes in the first array are disposed in a substantially straight line that extends across the body and the measurement nodes in the second array are disposed in a substantially straight line that is spaced apart from the first array. More preferably, the measurement nodes in the first array are substantially evenly spaced apart. In other embodiments, the arrays are non-linear.

Preferably also, the system includes a third array of measurement nodes that are spaced apart across the surface of the body, the third array being disposed adjacent to the first array on the opposite side to the second array for providing third measurement signals indicative of one or more predetermined characteristics of the body, wherein the a processing centre is also responsive to the third measurement signals during the provision of the input currents. That is, the first array is disposed intermediate the second and third arrays. In other embodiment, use is made of a greater number of arrays that are symmetrically disposed each side of the first array.

According to a fourteenth aspect of the invention there is provided a method for deriving survey data that is indicative of one or more geophysical properties of a geological body, the system including:

spacing apart across a surface of the body a first array of measurement nodes for providing first measurement signals indicative of one or more predetermined characteristics of the body;

spacing apart across the surface of the body a second array of measurement nodes that are disposed adjacent to the first array for providing second measurement signals indicative of one or more predetermined characteristics of the body;

disposing a reference current electrode in the body;

placing a moveable current electrode in the body sequentially between the nodes in the first array to provide respective input currents in the body that flow between the electrodes; and being responsive to the measurement signals during the provision of the input currents for determining the survey data.

BRIEF DESCRIPTION OF THE DRAWINGS

Preferred embodiments of the invention will now be described, by way of example only, with reference to the accompanying drawings in which.

DETAILED DESCRIPTION OF THE INVENTION

Figure 1:
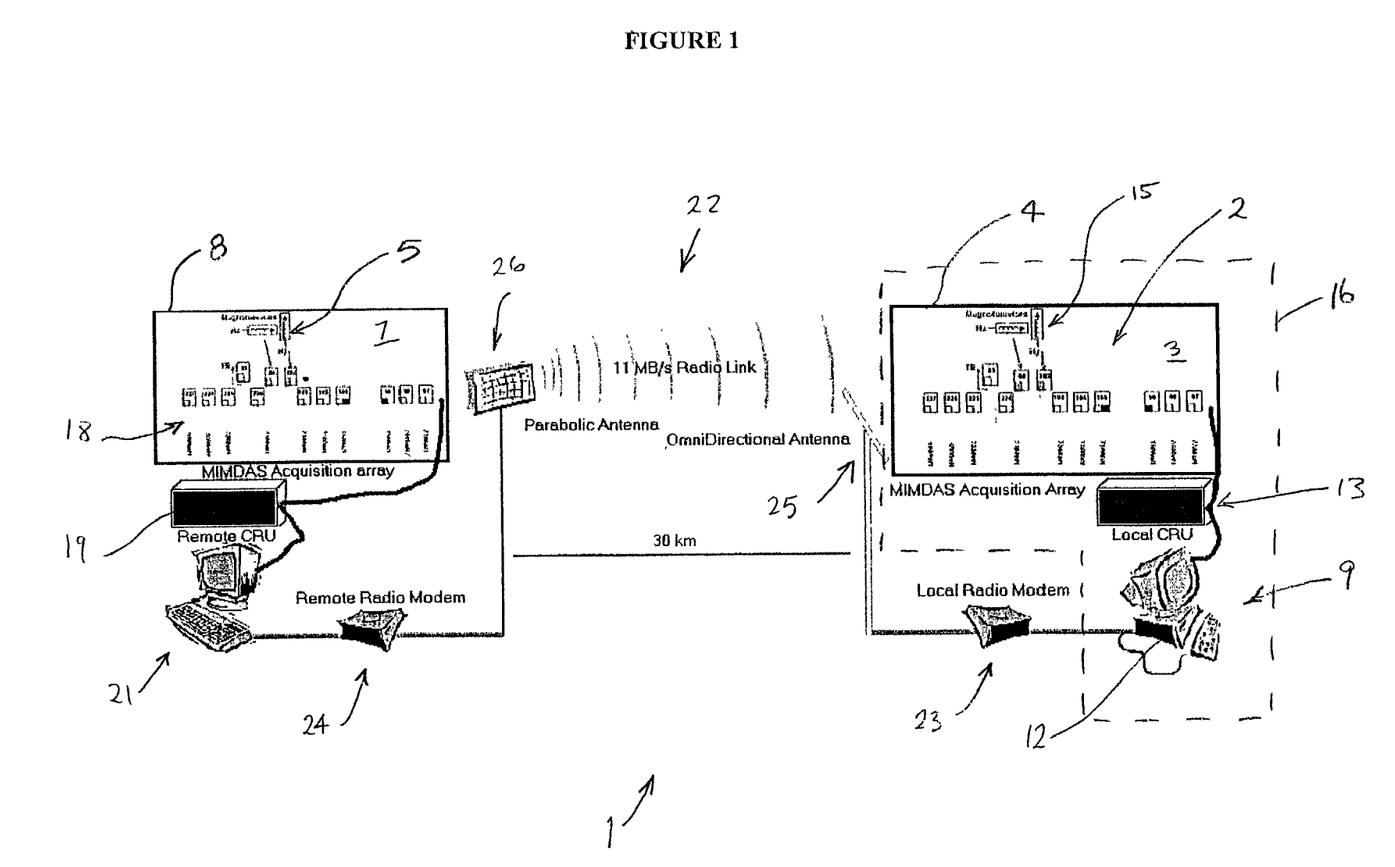
FIG. 1 is a schematic representation of a geological data acquisition system according to the invention.

Referring to FIG. 1, there is illustrated an induced polarisation (IP) data acquisition system 1. System 1 includes a plurality of linearly spaced apart measurement nodes 2 for obtaining synchronised measurement signals indicative of the electric field strength at a corresponding plurality of spaced apart locations at or adjacent to a surface 3 of a first geological body 4. A reference node 5 obtains reference signals indicative of the magnetic field strength at a location at or adjacent to a surface 7 of a second geological body 8 that is spaced apart from body 4. The reference signals are synchronised with the measurement signals. A processing centre 9 is responsive to the measurement signals and the reference signals for deriving a transfer function for body 4.

System 1 is configured for deriving survey data that is indicative of one or more geophysical properties a body 4 and use is made of the transfer function referred to above to more accurately derive the survey data. That is, processing centre 9, which takes the form of a local desktop computer 12, is responsive to the measurement signals and the reference signals for deriving the survey data.

Each of nodes 2 includes a sampling circuit (not shown) and memory (not shown) for respectively sampling and storing the measurement signals at a given time. In this embodiment, the sampling of the measurement signal is synchronised at all nodes in the linear array of nodes. Moreover, the measurement signals are sampled at each node about 48,000 times over the 10 minute duration of the survey. In other embodiments different sample rates are used. For example, in some embodiments the memory capacity of the node is not sufficient to store that many samples and, as such, the operator has to be content with a lower sample rate or a shorter survey.

Each node 2 also includes a transmitter (not shown) for allowing the contents of the respective memories to be passed to a local Central Recording Unit (CRU) 13. In this embodiment, the transmitters are connected in parallel to a common communication bus (shown schematically) so that the measurement data, together with a time stamp that is indicative of the time the sample occurred, are able to be communicated to CRU 13. In other embodiments, the transmitters are connected in a daisy chain arrangement such that, in effect, each transmitter communicates with the or each adjacent node to transfer the sampled measurement signals. That is, the nodes are connected so that the information contained within the node furthest from CRU 13 is transferred through all intervening nodes prior to being received by the CRU 13. The connection between the nodes and between the nodes and CRU 13 is by way of electrical cabling of the required category and specification.

In other embodiments, the nodes are connected such that each node communicates directly with CRU 13. While in some embodiments this connection is also achieved through the use of cabling, in other embodiments each transmitter is a wireless transmitter that sends the required data and information directly to CRU 13.

It will also be appreciated that, in some embodiments, each node includes a receiver corresponding to the transmitter to allow the daisy chain form of communication. When used in this form, the power requirement for each individual transmitter is reduced as it only need operate at a power level sufficient to communicate with the or each adjacent node.

It will be appreciated by those skilled in the art that the nodes need not be linearly spaced.

The measurement signals gained from the nodes 2 are used to provide data for an induced polarisation (IP) survey of body 4. That is, an input current signal, that roughly resembles a square wave, is injected into body 4 via two electrodes (not shown) that are generally located at the periphery of body 2. The quantum of the current is in the order of 5 Amps, although this is somewhat dependent upon the resistivity of body 4 and more particularly the surface resistivity of body 4. While the frequency of the input current in this embodiment is about 0.1 Hz, in other embodiments different frequencies are used. The choice of frequency is usually dependent upon the capacitive effect of body 4. That is, the more capacitive, the lower the frequency used. However, regard is also had to the amplitude of the input current.

The measurement data, gained from determining the voltage differences between the adjacent nodes 2, is transmitted to CRU 13. From there, that data is formatted and passed to computer 12 where it is processed, in real time, to provide the IP survey data.

System 1 also includes a node in the form of a magnetometer 15 that provides additional measurement data indicative of the magnetic field strength at the surface of body 4 along both an x and a y-axis. These axes are both parallel to surface 3 and normal to each other. In other embodiments, the magnetic field strength along three axes is provided. Moreover, in further embodiments, use is made of a number of spaced apart magnetometers. That is, the preferred embodiment is also suitable for magnetotelluric (T) and electromagnetic (EM) surveys.

The apparatus bounded by broken line 16 approximates the data acquisition system disclosed in Australian Patent Application no 58341/99 in the name of the present applicants.

Node 5 is included in a reference array 18 that is, in this embodiment, similar to the combination of nodes 2 and 15. Node 5 includes a magnetometer 17 while the remaining nodes in that array measure the electric field strength at the corresponding locations. These nodes are sampled and the reference data stored in respective memory prior to being communicated to a remote CRU 19, together with a time stamp. The sampling at the nodes in array 18 is synchronised with the sampling of nodes 2, and the synchronisation is achieved by accessing time data from one or more GPS sources.

A number of time spaced and synchronised samples are taken at each node in both arrays to provide the required data for the survey.

Array 18, being a reference array, need not include the same number of nodes as the measurement array 3. For the purpose of this example, the arrays include the same number of nodes. However, the more usual approach is for system 1 to include about 30 nodes 2, and array 18 to include about ten nodes. In another embodiment, however, system 1 includes about 1000 nodes, and array 18 includes about 100 nodes.

Body 8 is disposed remotely from body 4 and, in this embodiment, the separation between the two is about 30 km. In other embodiments a different separation is used. The extent of the separation is dependent upon terrain and geography, amongst other things. Preferably, however, the separation is at least a few kilometers. The maximum separation between the arrays is determined by the transmission distances of the radio transmitter used. However, with the use of repeater stations and/or satellite connections, the range is effectively limitless. That is, it is now possible to control the data acquisition and the derivation of the survey data from a site remote from both body 4 and body 8.

CRU 19 is controlled by and communicates with a remote desktop computer 21. This computer's primary functions include some processing of the reference data and the time stamps, and compressing the processed information for communication to computer 12. Moreover, computer 21 is responsive to computer 12 for initiating a survey and for ensuring synchronisation of the sampling.

The communication between the computers is established by a wireless link 22. In this embodiment, link 22 includes a local radio Ethernet modem 23 and a remote radio Ethernet modem 24 that are connected to computers 12 and 21 respectively. Modem 23 drives and receives from an omnidirectional antenna 25 that is located at or near body 4, while modem 24 drives and receives from a parabolic antenna 26 that is located at or adjacent to body 8. The data rate of the wireless communication is 11 Mbit/sec. However, in other embodiments, alternative rates are used.

Link 22 provides for real time two-way communication between computers 12 and 21 and, hence, the operation of the local and remote nodes is able to be coordinated in real time. In this embodiment, computer 12 is the point of central control for the survey, and is the means by which an operator initiates a survey. That initiation will not only trigger CRU 13 to commence data logging at a predetermined sample rate at nodes 2, but also the communication over link 22 of command signals to computer 21. Those command signals will include information about the type and quantity of reference data required from array 18, as well as the synchronisation information.

In this embodiment, both CRU 13 and 19 include GPS capability and this is utilised to provide the time stamping and synchronisation. The accuracy of the GPS system has been found to be sufficient for the purposes of the surveys being conducted.

As the reference data provided by array 18 is able to be communicated from computer 21 to computer 12 in real time, there is significant advantage gained. For example, when the survey is initiated the first set of samples gained from nodes 2 and array 7 are used to determine whether all nodes 2 are functioning correctly. This verification step will usually involve about 10,000 samples taken over a 5 minute interval. With this information in hand it is possible to either have the malfunction corrected or, alternatively, to ignore any data gathered at the node concerned.

Once sufficient verification of nodes 2 has been achieved, the survey proper is commenced. The survey requires sufficient data to be gathered from the reference and measurement arrays so that the subsequent analysis will be valid within the commercial and theoretical limits being imposed upon the operator of system 1. As will be explained further below, the present embodiment is able to provide much greater accuracy than prior art systems and yet not have to take as many samples from nodes 2. This is due to the use of the remote referencing provided by array 18. Moreover, the data is available in real time to the operator.

In some respects the speed of system 1 arises from a distributed computational power, in that there are two processing centres, one being computer 12 and the other computer 21. However, through use of truly remote reference signals, and the synchronisation of the sampling of the reference and measurement signals, even greater advantage is gained. Conventional wisdom suggests that having a reference array requires the gathering of more data and, as a consequence, even more processing is required to derive the survey results from that data. This, in turn, introducing an even greater delay in the delivery of the survey results. However, in this embodiment, there arises a synergy between the measurement signals and reference signals that allows far less data to be gathered as only synchronised data is obtained. This, in turn, allows system 1 to provide real time analysis of the results as well as real time quality assurance of the data. The reduced data requirements also reduce pressure on the storage requirements both at the nodes, the CRU and the local computer.

As will be appreciated by a person skilled in the art, based upon the teaching herein, computers 12 and 21 include software for allowing an operator to control the survey. In some embodiments this is possible through the use of "off the shelf" software that has been appropriately configured, while in other embodiments use is also made of in-house or proprietary software. In this embodiment use is made of "off the shelf" software components, in combination with an in-house operating system known as "Dirt Burglar".

Once array 18 has been set up it need not be manned, or at least it need not be manned by skilled personnel. That is, array 18 is more or less self sufficient and useable for any number of surveys, whether those surveys be in respect of body 2 or another body remote from body 2. All that is required is the ability to communicate with computer 21, as that computer is responsive to incoming commands for commencing the acquisition of reference data. This allows the survey costs to be minimised as there is no need for remote operation and the reference array is reusable.

The preferred embodiment is particularly advantageous as it accommodates real time remote reference noise cancellation for induced polarization, electromagnetic and magnetotelluric surveys.

Figure 9:
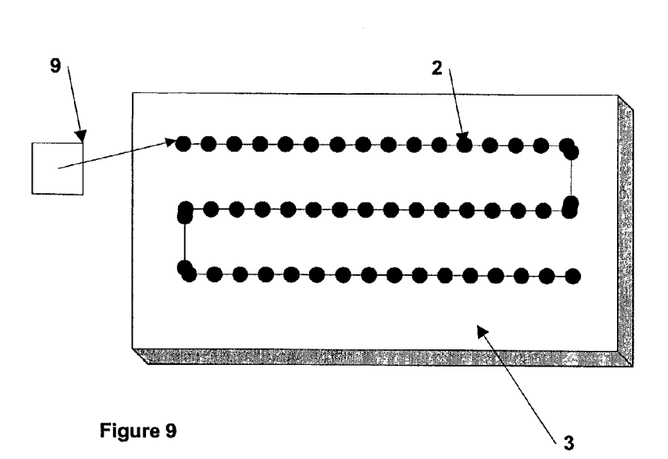
FIG. 9 is a schematic top view of the geological body under investigation with one type of array of nodes.

In use, the first step in conducting a survey involves setting up the physical components of system 1. This includes locating nodes 2 in a spaced array that extends across surface 3, as best shown in FIG. 9. The array is linear and the nodes are connected in a daisy chain to CRU 13. The array of nodes includes three parallel longitudinal branches that are transversely spaced apart and connected by intermediate transverse links. In other embodiments use is made of more than three longitudinal branches. The size of the array is limited in some cases by the available nodes. However, in other cases it is limited by the size of the memory contained in each node, the rate of data transmission possible from the nodes to CRU 13 and the sample rate for the given survey.

In the event that there are insufficient nodes 2 to allow all of body 4 to be investigated in a single sweep, it is possible to conduct a first survey and then move nodes 2 to a new position on surface 3 and conduct another survey, the results of which are combined with those of the first. In further embodiments more than two surveys are combined.

Figure 10:
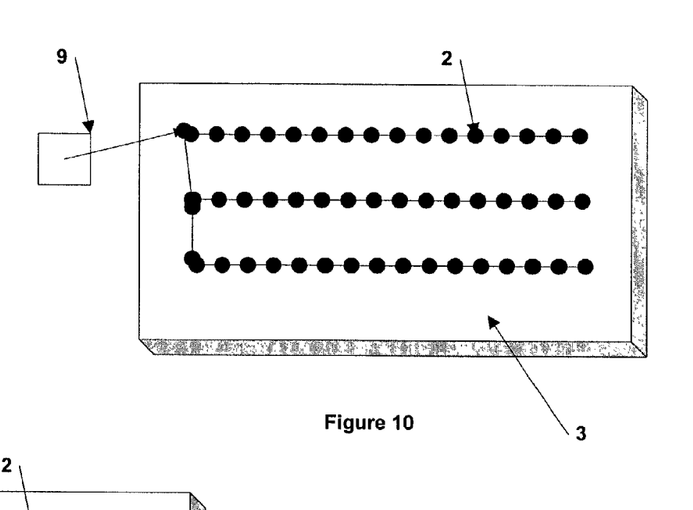
FIG. 10 is a schematic top view of the geological body under investigation with another type of array of nodes.
Figure 11:
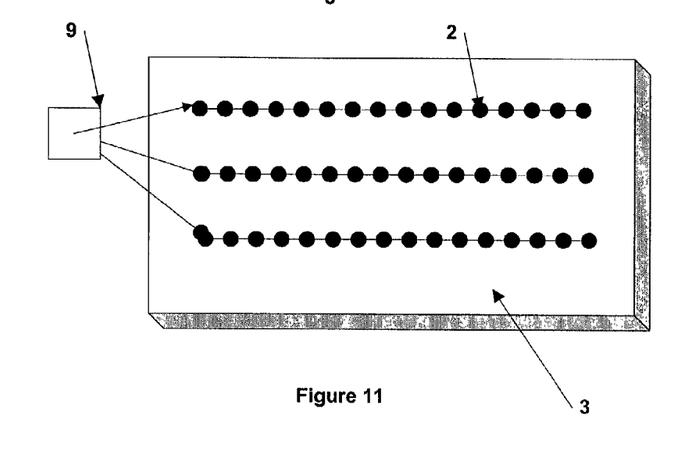
FIG. 11 is a schematic top view of the geological body under investigation with a further type of array of nodes.

Alternative embodiments include nodes 2 being laid out in different configurations to that of FIG. 9. By way of example, the embodiment of FIG. 10 includes three parallel longitudinal branches that are transversely spaced apart and which are interconnected at a common end. The other example, as shown in FIG. 11, has nodes that are disposed in three parallel longitudinal branches that are transversely spaced apart and which are separately connected to processing centre 9. The FIG. 11 embodiment, for a given rate of data transmission between nodes, allows for a greater length of array. However, it does require that CRU 13 has at least three channels for receiving data from the respective branches and for sending command signals to the nodes in those branches.

For IP surveys the usual longitudinal spacing between nodes is about 100 meters, while the usual transverse spacing between branches of nodes is about 200 meters. However, as would be appreciated by the skilled addressee, these parameters are varied in accordance with the geology and other factors.

Magnetometer 15 is also disposed on surface 3, although this is optional for an IP survey such as that which is being performed by this embodiment. In other embodiments, a plurality of spaced apart magnetometers are used, particularly for MT surveys.

The modem 23 and antenna 25 are also configured at this stage.

At the remote or reference site, magnetometer 5 is set up for taking measurements of the magnetic field strength along the x and the y axis. In the event that an MT survey is also required, then an array of nodes 18 are also provided for obtaining measurements of the electric field strength at the respective locations. The spacing between the nodes 18 is preferably the same as the spacing between nodes 2.

Modem 24 and antenna 26 are set up and a communication link established between computers 12 and 21.

Figure 12:
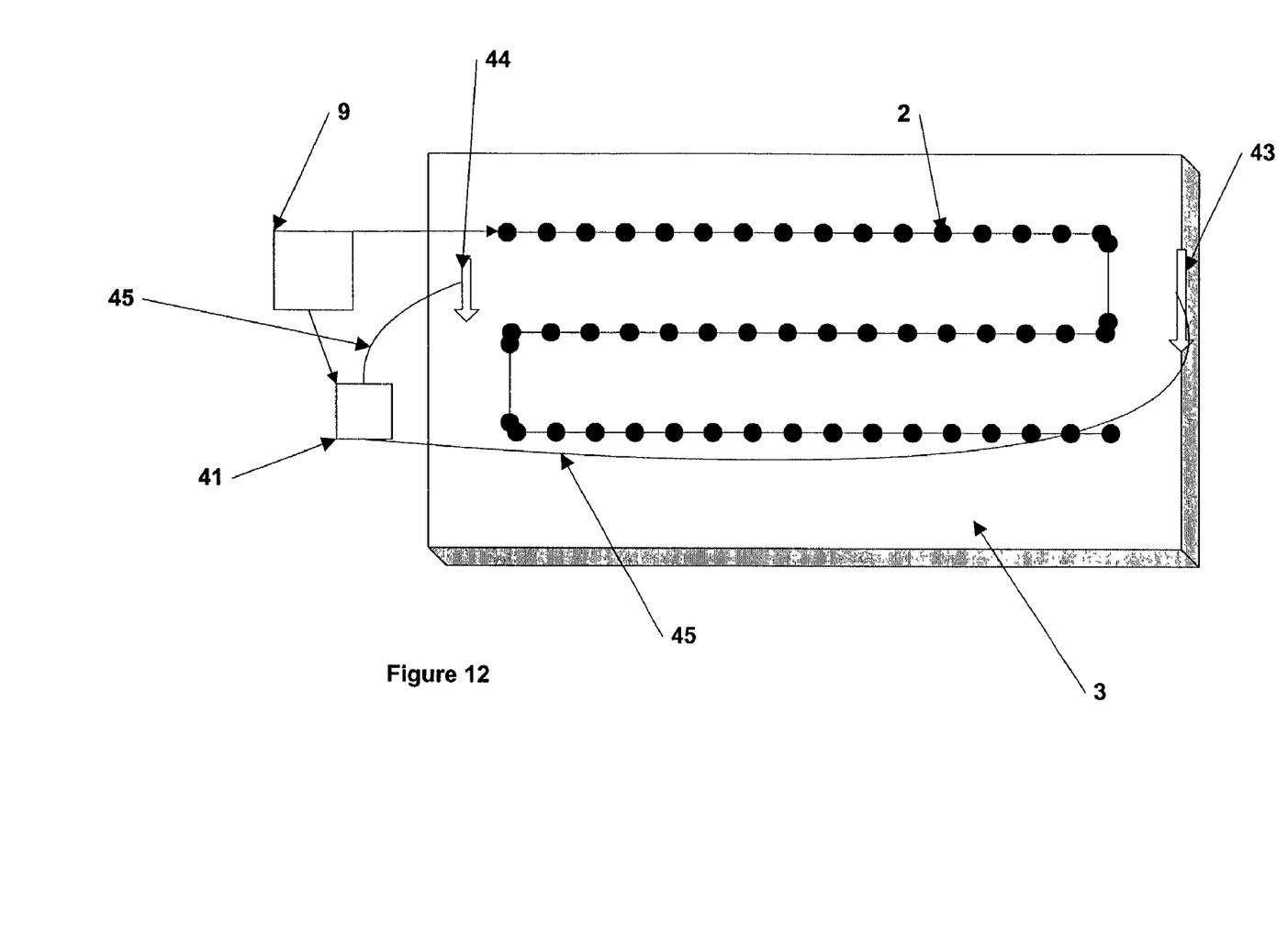
FIG. 12 is a schematic top view of the geological body that is the subject of an IP survey according to an aspect of the invention.

As best shown in FIG. 12, system 1 includes a generator 41 that is responsive to processing centre 9 for providing a square wave input current signal (not shown). This current signal is injected, as required, into body 4 via electrodes 43 and 44 that are connected by cable 45. Generator 41 includes an ammeter (not shown) for sampling the current signal in synchronism with the measurement signals from the local nodes 2 and the reference signals from the remote nodes 5 and 18. This sampled current signal is provided to computer 12 as an input signal that is indicative of the current signal.

With all these physical components now in place, the operator of system 1 conducts a pre-survey investigation. This occurs through the operator utilising computer 12 to:

1. Verify that all nodes 2 and magnetometer 15 are initiated and ready to commence sampling;
2. Verify that magnetometer 5 and all nodes 18 are initiated and ready to commence sampling;
3. That CRU 13 and CRU 19 are configured for the survey to be undertaken;
4. Actuate generator 41 to supply a predetermined square wave current into body 4.
5. Actuate nodes 2 to make a plurality of synchronised samples for providing the desired measurement signals.
6. Actuate magnetometer 5 to make synchronised samples to provide respective reference signals; and
7. Actuate the ammeter to sample to current signal in synchronism with the sampling of the measurement and reference signals.

This survey runs for about 5 minutes at a sample rate of about 100 Hz. The data sampled is feed back to computer 12 and presented in a graphical form to the operator. In this instance, the operator is provided with a time series representation of the samples from magnetometer 5 along both the x-axis and the y-axis to allow an error check to be carried out. This error check takes the form of a comparison of the averages of the measurements along those axes, over a given period. These averages are also displayed to the operator and, if they differ beyond a predetermined threshold, it is deemed that there is an error in the measurement and a fresh set of data is obtained. If, once the fresh data has been obtained, the threshold is again exceeded, further investigation is taken into the physical condition of the magnetometer and the surrounding environment.

If the averages of along those axes differ by less than the threshold the operator, via computer 12, analyses the data that was sampled and supplied by magnetometer 5 and the ammeter. Particularly, a Fourier analysis is done to determine whether the sampled signal shares unexpectedly high levels of frequency components with the input signal. If so, the remote body 8 is not truly remote in that it is insufficiently decoupled from body 4 to provide a low noise reference. That being the case, a new remote reference body will have to be found.

Importantly, this determination of suitability of body 8 is done in real time in that computer 12 and/or computer 21 commence the processing of the data as soon as it is received. Accordingly, the operator is provided with real time feedback not only on the quality of the reference measurements but also on the suitability or otherwise of the remote body as a reference site. Moreover, the Fourier analysis is undertaken automatically by computer 12 and the threshold earlier determined. This relieves the operator from having to make these decisions in the field. It also greatly automates the survey while not preventing the operator from delving further into the detail of the measurements, if required. It should also be noted that when body 8 is not sufficiently remote, this is usually clearly illustrated to the operator simply by overlaying the time series data from magnetometer 5 with the time series data from the ammeter.

The use of the remote referencing of the preferred embodiment allow considerable time and resources to be conserved with the simple real time error checks that have been described above. In either case, the survey will not be carried out unless there is sufficient decoupling between the remote body and the local body. For prior art IP survey systems, even if the error were discovered, this would not have occurred until post processing of the data occurred.

With the initial verification complete, the operator then deactivates generator 41. That is, the injected current signal is halted. Following this, the operator conducts a second round of data gathering, this time in the form of a MT style survey. More particularly, this involves having:

1. Nodes 2 at the local body, body 4, obtaining measurement signals that are indicative of the electric field strength along an x-axis; and
2. Magnetometer 5 at the remote body, body 8, obtaining reference signals that are indicative of the magnetic field strength along a y-axis.

The measurement and reference signals are sampled over a twenty minute period at about 400 Hz and communicated to computer 12. In other embodiments, different times and sample rates are used in accordance with the practical trade off that the operator wishes to make between cost and accuracy.

The measurement and reference signals are used as a basis for calculating a transfer function for body 4. The transfer function, T(f), is:

$$T(f)=K.E_x(f)/H_y(f) \qquad \text{Equation 1}$$

Where K is a constant, $E_x(f)$ is the electric field strength along the x axis at the local body 4 and $H_y(f)$ is the magnetic field strength along the y axis at the remote body 8. For a constant geology, this function holds true. The accuracy is limited usually by the quality of the measurement and reference signals and, as such, in this embodiment, the survey time and sample rate are high to provide a not only a large quantity of data to minimise errors, but also to provide for a broad frequency range for the transfer function.

Once sufficient data has been gathered to allow the determination of the transfer function to the desired accuracy, magnetometer 5 is placed on standby. This is achieved either automatically, or by the operator selecting the appropriate command sequence with computer 12. The computer then initiates a final verification that all the nodes are in service, and provides command signals to those nodes, including timing information, such that the subsequent measurement and reference signals will be synchronised. In some embodiments, the nodes will be provided with timing signals by CRU 13 and 19 which, in turn, include GPS referencing hardware. In other embodiments, the nodes have independent access to timing information.

The timing information is in the form of a start time for the survey and a sample rate. In other embodiments, however, the timing information is a series of times at which samples are obtained by the respective nodes.

Once the command signals have been sent and the relevant nodes have confirmed receipt of the command signals, computer 12 actuates generator 41 to once again inject the current signal into body 4 in preparation for an IP survey. Electrodes 43 and 44 are initially disposed as shown in FIG. 12 and the data is gathered from the relevant nodes. For the IP survey being conducted, this data includes measurement signals from nodes 2 that are indicative of the electric field strength along the x-axis and reference signals from magnetometer 5 that are indicative of the magnetic field strength along the y-axis. Once sufficient number of measurement and reference signals have been obtained and provided to computer 12, electrode 44 is moved from adjacent to the first node 2, as shown in FIG. 12, and relocated to be intermediate the first node and the second node. An additional set synchronised of measurement and reference signals are then obtained and provided to computer 12. Electrode 44 is then relocated to be intermediate the second node and the third node and another set of synchronised measurement and reference signals are obtained. This sequence continues up until measurement and reference signals have been obtained for the positioning of electrode 44 between all the nodes intermediate the electrodes.

As the measurement and reference data is collected and collated by computer 12, the originally determined transfer function is used, in light of the measurement and reference signals obtained in the presence of the injected current, to calculate a predicted noise correction factor. This factor takes the form of a time varying noise signal that is then subtracted from the measured $E_x$ signal at the local source. This correction factor provides superior noise cancellation effects.

As the physical location of a source of noise will determine the timing of that noise at the local and the remote bodies, a simple subtraction of the simultaneously collected samples of like properties at those spaced apart bodies is inaccurate and misleading. The problems of this conventional approach are avoided through use of the preferred embodiment, which:

1. First verifies the remoteness of the remote body;
2. Determines a transfer function for the bodies that makes use of a predetermined parameter at the local body and an interrelated but different parameter at the remote body;
3. Acquires the data required for the desired survey;

4. Calculates a predicted noise signal based at the local body upon the survey measurements and the transfer function; and
5. Subtracts this predicted noise from the relevant signals to provide the corrected survey data.

Moreover, these additional steps are completed quickly and effectively by the preferred embodiment through the use of wireless communications. The use of synchronisation between the measurement and reference signals also allows a minimum of data to be collected to authenticate the survey and, as such, even in the event of errors—due to, for example, a nearby lightning strike—the survey is easily and quickly rerun.

Figure 2:
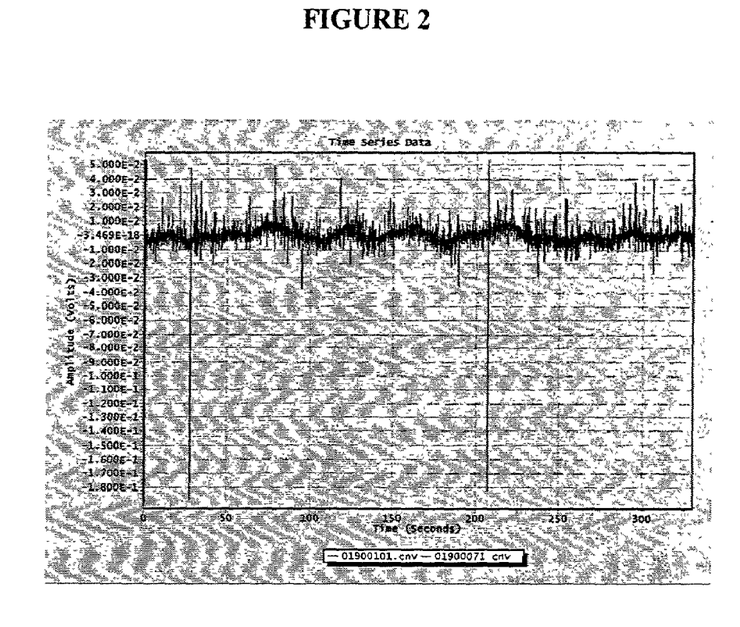
FIG. 2 is a time series plot for the output of two magnetometers, one in the local field and one in the remote field.
Figure 3:
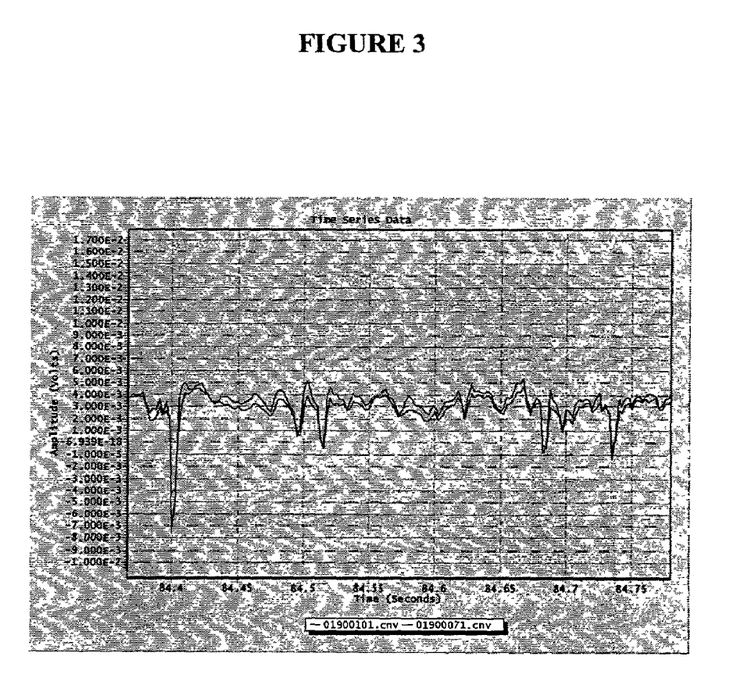
FIG. 3 is an enlarged portion of the plot of FIG. 2.

By way of example, a time series plot of the sampled output from the X-axis of respective magnetometers 15 and 5 are overlaid in FIG. 2. In this example, the two magnetometers are remote from each other by 13.2 km. An enlarged portion of the FIG. 2 plot is shown in FIG. 3, and illustrates more clearly the differences between the magnetic field strength along that axis. As shown, these differences, while apparent, are relatively small notwithstanding the considerable distance between the two measurement sites. Following from this, it is possible to predict, with sufficient accuracy, the local magnetic field using a truly remote magnetic field reference.

The data shown in FIG. 2 and FIG. 3 is available for viewing by the operator, if required, as soon as it is gathered and communicated to computer 12. The data will arrive either via CRU 13 for the data provided by magnetometer 15, or sequentially via CRU 19, computer 21 and link 22 for the data provided by magnetometer 15.

The real time acquisition of the reference data "on demand" by CRU 19 reduces the amount of data actually required to be collected. It also provides the operator with confidence that the nodes in the arrays at bodies 4 and 8 are synchronised, as the operator is able to view both the reference and measurement datasets. This eliminates wasted survey time.

Time synchronisation, in conjunction with wireless LAN such as link 22, allows the use of measurement arrays having in the order of 1000 channels without necessitating movement of the CRU 13, computer 12 and array 7.

Figure 7:
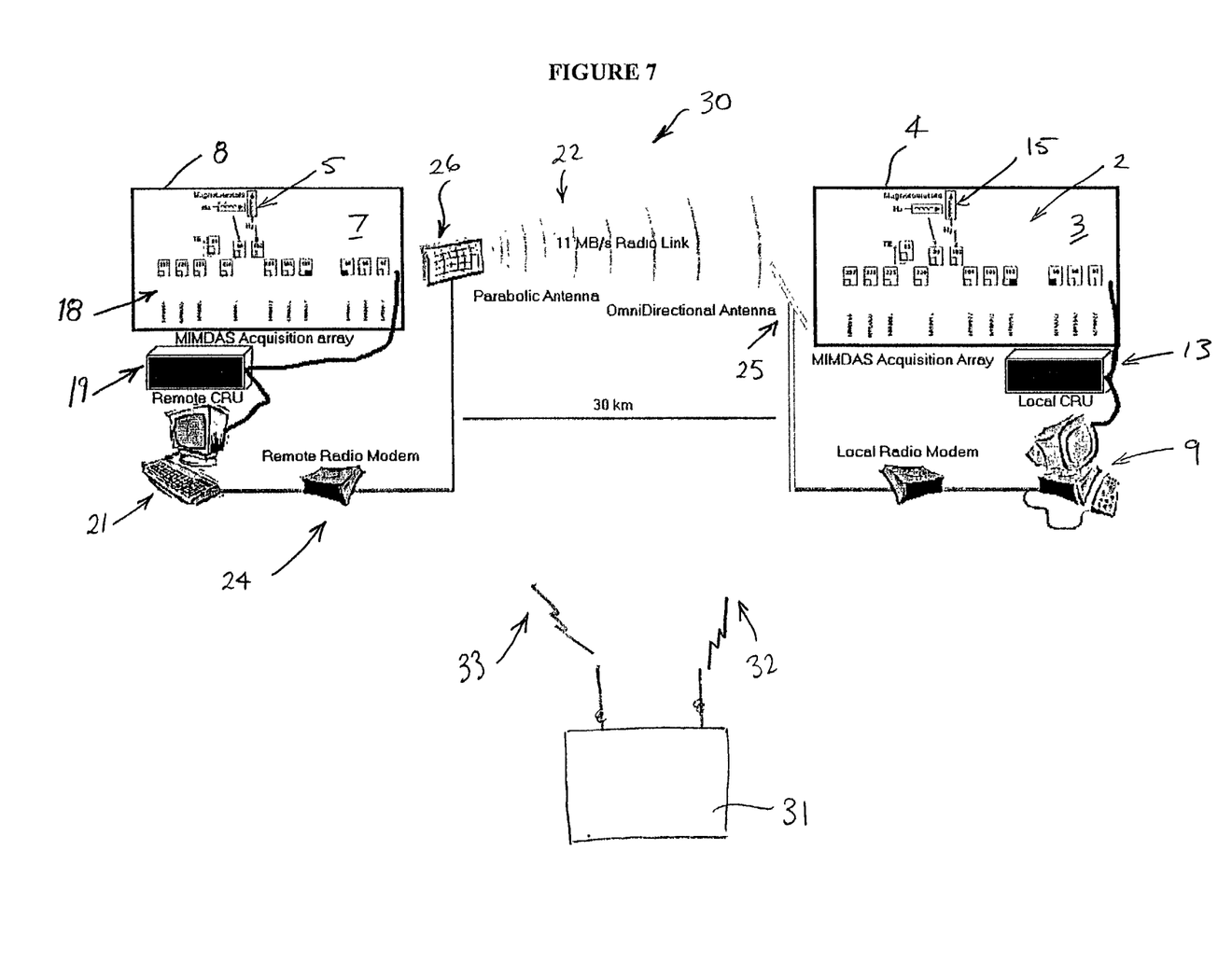
FIG. 7 is a schematic representation of an alternative geological data acquisition system according to the invention.

Another embodiment of the invention, system 30, is illustrated in FIG. 7, where corresponding features are denoted by corresponding reference numerals. In this embodiment, computer 12 and computer 21, as well as communicating with each other via link 22, also communicate separately with a central control centre 31 via communication links 32 and 33. In this embodiment both links 32 and 33 are wireless links. Moreover, while both computers 12 and 21 are operational for processing and communicating data, they are both controlled by an operator that is located at centre 31.

Depending upon the location of the transmission sites, the communication links include satellite, cell phone or radio links. This allows real time quality control of the survey by a central administrator, notwithstanding that that administrator is located in another state or country to the actual survey.

System 1 has been developed primarily for combined magnetotelluric (MT) and Induced Polarisation (IP) surveys. It has been found that the noise affecting these two types of surveys have a peculiar antithetic relationship, in that the noise in the data for the IP survey is the predominant signal of the data in the MT survey.

One known way to minimise the noise in IP data using the results of MT survey data that is collected at the end of the IP data collection is illustrated in the Australian application referred to above. Another alternative is used in system 1 and 30, and includes the collection of synchronous remote magnetic field information (using wireless LAN) with local integrated electric field information. The spectral information produced from the routine MT processing in conjunction with the remote data is processed, in real time, to predict the local telluric response at any of the IP measuring dipoles. This predicted noise is subtracted from the recorded time series, or from the calculated spectral responses, to provide much cleaner data.

Figure 4:
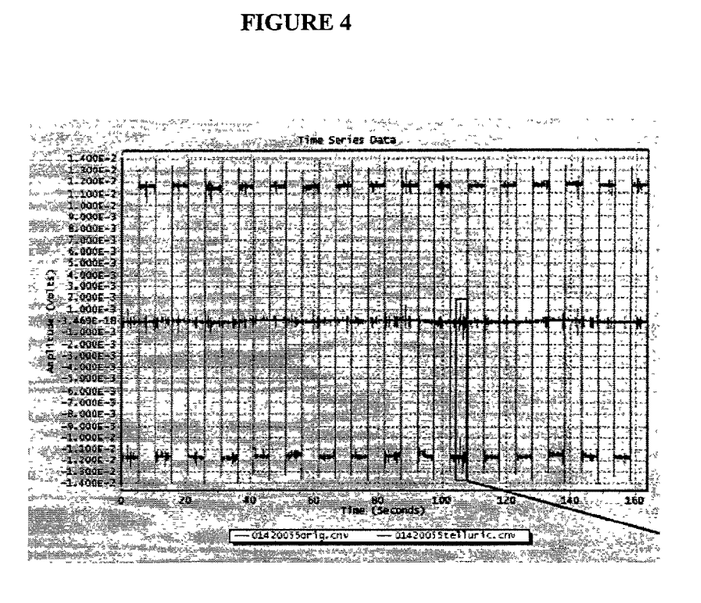
FIG. 4 is a plot of the induced polarisation time series data for the first body and the calculated telluric noise.
Figure 5:
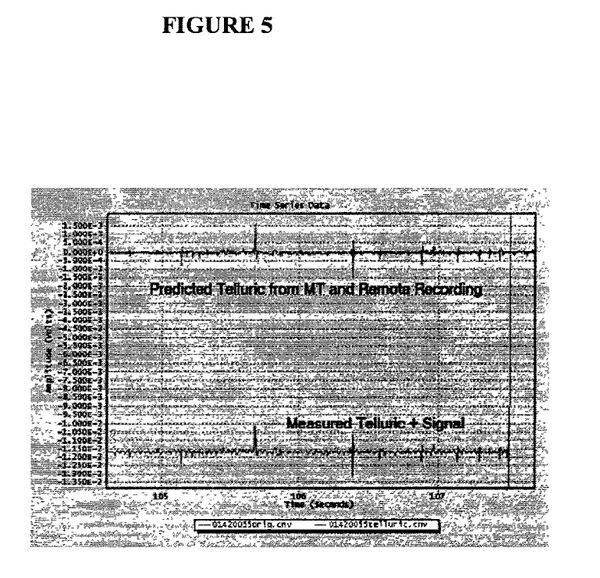
FIG. 5 is an enlarged portion of the plot of FIG. 4.
Figure 6:
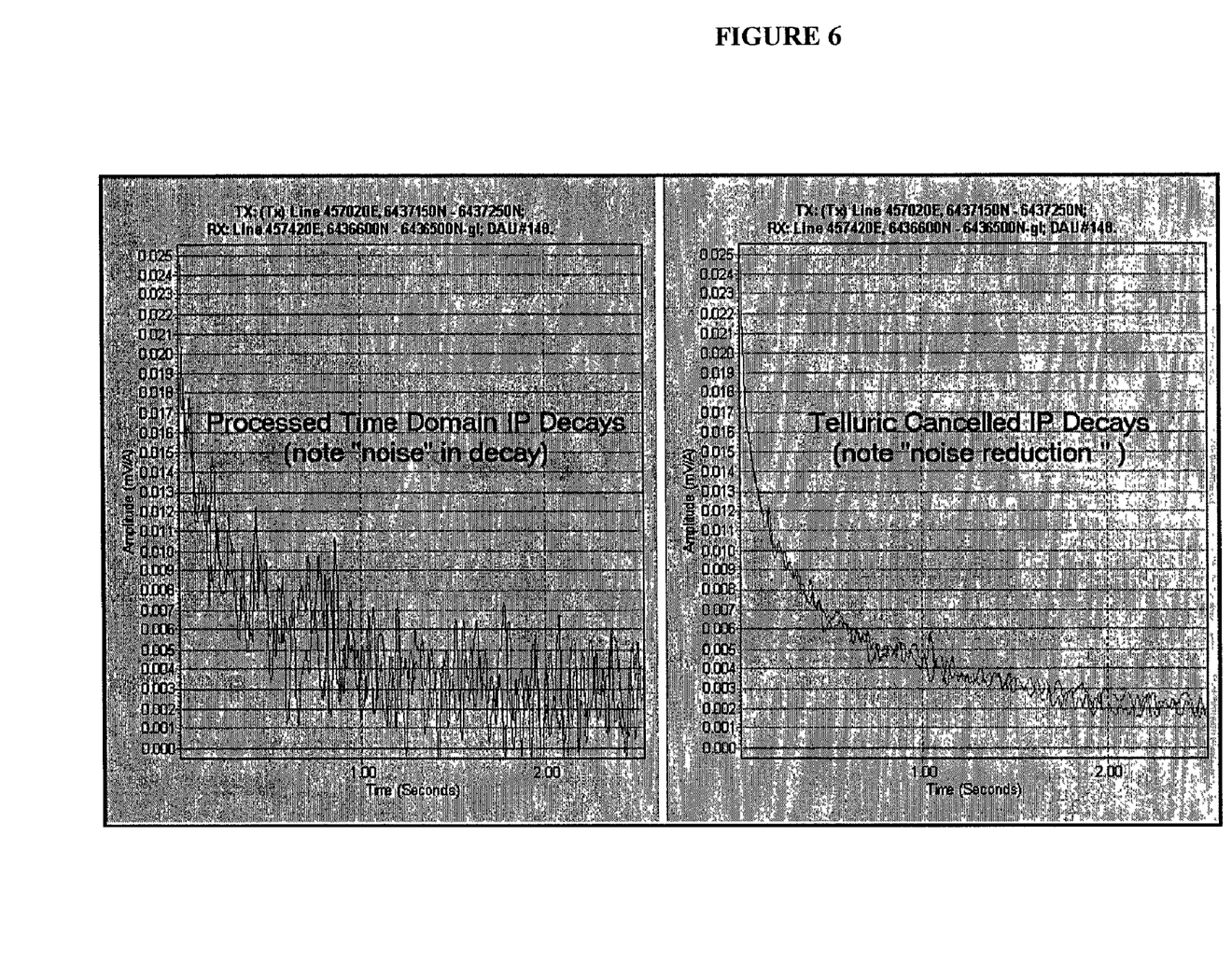
FIG. 6 is a comparison of the induced polarisation decay signal for a system not operated in accordance with the preferred embodiment and a system operated in accordance with the preferred embodiment.

An example is illustrated in FIGS. 4 to 6. The psuedo square wave in FIG. 4 is the IP time series data. That is, the data is a voltage that resembles the input current signal. As will be appreciated by the skilled addressee, it is the decay characteristics that are of particular interest and these are relatively small in comparison to the overall voltage signal provided and, hence, highly susceptible to noise corruption. The other plot extending through the centre of FIG. 4 is the "predicted" telluric noise calculated from the remote reference magnetic data and the MT processing for that node and for the defined time.

For the sake of clarity, the area in FIG. 4 that is bounded by a rectangle, is shown enlarged in FIG. 5. This shows a close correlation between the predicted and recorded noise.

After removal of predicted noise from the time series the processing provided by computer 12 yields IP decays which are much improved. For example, the plot in FIG. 5 shows two repeat readings—that is, using the same transmitter and receiver pairs—for a given decay. The left panel shows the results from the standard processing stream and the right pane shows the results with the telluric cancellation scheme of the preferred embodiment. As suggested above, both these plots are available to be accessed by an operator in real time. This allows the operator to gain a greater understanding and appreciation of the operation of system 1 and to perform quality control steps both initially and throughout the survey. It also allows the operator to be located other than at the site of the survey.

The noise cancellation scheme referred to above works well with a remote reference. However, an alternative embodiment of the invention (not shown) gains similar benefit through the use of local magnetotelluric results. That is, the array consists of multiple E and H sensors at each dipole location, to allow non plane-wave signals—that is, local noise—to be isolated from each node.

The quality of the survey data provided by the preferred embodiments is enhanced by noise reduction strategies using MT data. Those embodiments also collect reference data at multiple sites to overcome local, non-plane wave noise sources. The collection of truly remote data, with radio links and GPS synchronisation, aids in the rejection of non-coherent local noise signals.

Importantly also, the real monitoring of synchronised remote data allows in-field processing to reduce noise and thus improve the quality assurance and quality control of the survey and the survey data.

Use of magnetometer to reduce IP noise also allows for a reduction in the resistivity noise.

While the use of a truly remote array provides significant advantage over the prior art, there is even more to be gained through the use of IP noise reduction using local MT measurements. That is, the latter provides substantially the same processing and noise reduction benefits while also negating the need for a remote array.

Through use of the embodiments of the invention and the IP noise reduction that is provided, it is possible to collect reliable data from areas where prior systems have failed. For example, there are areas in Chile, and other places, where a very resistive near surface layer prohibits high current inputs into the ground thereby minimising the received signal. In conventional systems the noise component cannot be adequately removed thus making acquisition useless. The noise correction of the preferred embodiments, however, provides a far more robust and versatile system.

For EM type surveys, the noise prediction allows EM noise reduction by direct subtraction and performed in real time.

Figure 8:
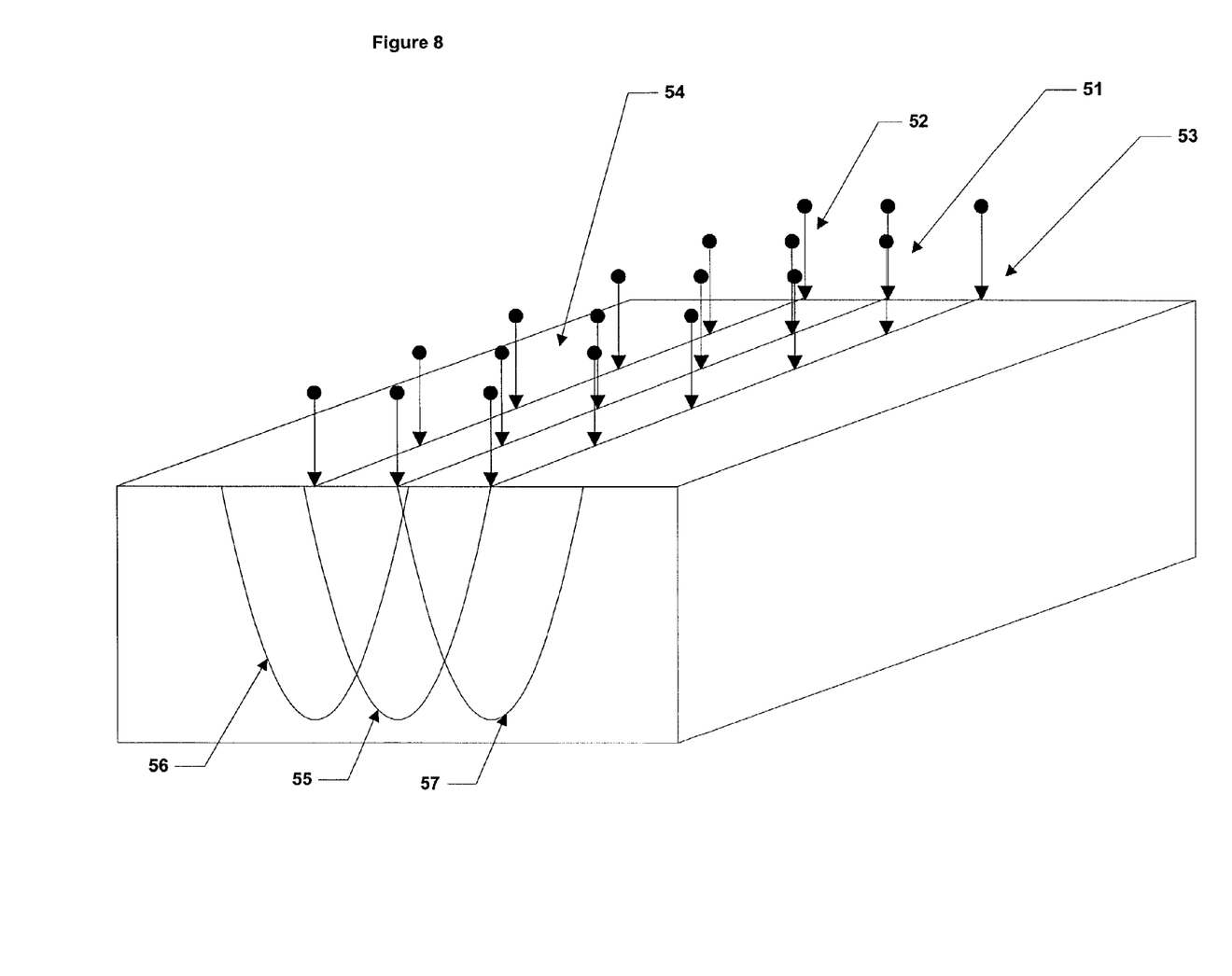
FIG. 8 is a schematic representation of a geological body that is under investigation through use of an array according to one aspect of the invention.

Referring to FIG. 8 there is illustrated a schematic view of three parallel arrays 51, 52 and 53 that are extend longitudinally across a geological body 54. Each array includes a plurality of spaced apart nodes (represented by downwardly extending arrows) that sample a predetermined characteristic of the body at the respective locations. As described with reference to the other embodiments, the nodes are linked in a daisy chain configuration. In this embodiment, as with the above embodiment, the each array is configured to provide sampled data for an IP survey. That is, each of the nodes samples the electric field strength at that node at a given rate over a given period, and has these samples sent to a local computer for subsequent analysis of the samples.

As described with reference to the IP survey of FIG. 12, the movable electrode is located successively between the nodes and additional samples taken. So too, in the FIG. 8 embodiment, is the moveable electrode (not shown) progressed between the nodes in array 51. However, at each location of the moveable electrode, not only are samples obtained by the nodes in array 51, but also by the nodes in the flanking arrays 52 and 53. This effectively allows a greater volume of body 54 to be investigated with a single pass of the moveable electrode along body 54. That is, this embodiment provides in a single pass of the moveable electrode more information than would have been gained from three passes of the prior arrays.

Particularly, the volume of body 54 investigated by array 51 is approximated by the elliptical cross section bounded by line 55. The volume of body 54 that is investigated by arrays 52 and 53 is approximated by the respective elliptical cross section bounded by lines 56 and 57. It will be appreciated that these elliptical cross sections extend longitudinally along body 54.

The fact that measurement signals are obtained from the three arrays in synchronism allows accurate mapping of the subsurface topography in both the x and y directions. Moreover, as the number of moves of the moveable electrode is reduced, in this case by a third, it provides a significant time and cost saving to the survey. This is in addition to the benefits described above to do with error checking and noise reduction through use of a remote reference.

This arrangement is such that there are a number of arrays disposed about body 54, where at least one of those arrays is active, in that the moveable current electrode is being progressed between the nodes of the active array. The remainder of the arrays are passive, in that the moveable current electrode is not progressively disposed intermediate the respective nodes in the passive arrays. Importantly, however, the nodes in the passive arrays sample in synchronism with the nodes in the active array to allow additional data to be gained while minimising the time consuming task of relocating the moveable electrode. The passive arrays are also referred to as shadow arrays.

In other embodiments use is made of two additional passive arrays that are disposed parallel with the other arrays and which flank arrays 52 and 53 respectively. While the samples collected from these additional arrays is also useful, it will not provide the same depth of penetration into body 54 as is the case for the other arrays. Even greater numbers of passive arrays are used in other embodiments, particularly where the transverse spacing between the arrays is small.

The arrays shown in FIG. 12 are coextending and have the same number of nodes. Moreover, corresponding nodes in the arrays are aligned along a transversely extending axis. In other embodiment, however, the nodes in adjacent arrays are offset longitudinally. Preferably the offset is half the spacing between adjacent nodes in the same array.

Although the invention has been described with reference to specific examples, it will be appreciated by those skilled in the art that it may be embodied in many other forms.

The invention claimed is:

1. An induced polarisation (IP) data acquisition system for deriving geological survey data that is indicative of one or more geophysical properties of an opaque first geological body, the system including:
   a first plurality of measurement nodes located at or adjacent the surface of the earth and adapted to obtain a plurality of measurement signals indicative of the electric field strength at a corresponding plurality of spaced apart locations at or adjacent to a surface of said first geological body, in response to an electrical input current signal injected via electrodes into the first geological body, wherein the plurality of measurement signals are synchronised among each other;
   a reference node located at or adjacent the surface of the earth and adapted to obtain reference signals indicative of the magnetic field strength at a location at or adjacent to a surface of a second geological body that is spaced apart from the first geological body, in response to the input current signal injected into the first geological body, wherein the reference signals are synchronised with the measurement signals; and
   a processing centre being responsive to the measurement signals and the reference signals for deriving a transfer function for the first body, said system being adapted to identify geophysical properties below the surface of the earth;
   wherein a predicted noise signal is determined by applying the transfer function to measurement signals and reference signals that are subsequently obtained in the presence of a current signal in the first geological body, where the predicted noise signal is subtracted from those subsequent measurement signals to provide corrected measurement signals.

2. A system according to claim 1 wherein the transfer function is proportional to the measurement signals and inversely proportional to the reference signals.

3. A system according to claim 1 wherein the measurement signals are taken along a substantially horizontal first axis and the reference signals are taken along a substantially horizontal second axis, where the first axis is normal to the second axis.

4. A system according to claim 1 wherein the transfer function is frequency dependent and the measurement signals are representative of electric field strength and the reference signals are representative of magnetic field strength.

5. A system according to claim 1 wherein the transfer function is calculated for each of the measurement nodes.

6. A system according to claim 1 wherein the transfer function is calculated for the first body as a whole.

7. A system according to claim 1 wherein there are a plurality of spaced apart measurement nodes.

8. A system according to claim 1 wherein the measurement nodes each include a transducer for providing the measurement signal and a sampling circuit and memory for respectively sampling and storing the measurement signal.

9. A system according to claim 1 wherein each measurement node includes a transmitter for allowing that node to communicate with at least one adjacent node to transfer the stored measurement signal to the processing centre.

10. A system according to claim 1 including a plurality of reference nodes that are arranged in an array that is similarly configured to the array of measurement nodes.

11. A system according to claim 1 wherein the measurement signals and the reference signals are digital signals.

12. A system according to claim 1 wherein the measurement signals and the reference signals are synchronised with each other.

13. A system according to claim 1 wherein the measurement signals from each of the first nodes are synchronised with each other.

14. A system according to claim 1 including a plurality of spaced apart second nodes for providing respective reference signals that are synchronised with each other.

15. A system according to claim 1 wherein one or more of the reference signals and one or more of the measurement signals includes respective magnetotelluric data and the processing centre is responsive to the magnetotelluric data to reduce the effect of non-plane wave noise sources on the survey data.

16. A system according to claim 8 wherein each sampling circuit obtains a plurality of time spaced apart samples of the first signal.

17. A system according to claim 10 wherein there are more measurement nodes than reference nodes.

18. A system according to claim 16 wherein the spaced apart samples are synchronised with the sampling of the reference signals.

19. A system according to claim 16 wherein the memory stores data indicative both of the sampled first signals and the timing of the sample.

20. A method of acquiring induced polarisation (IP) data for use in deriving geological survey data that is indicative of one or more geophysical properties of an opaque first geological body, the method including:

obtaining a plurality of measurement signals indicative of the electric field strength at a corresponding plurality of spaced apart locations located at or adjacent the surface of the earth and located at or adjacent to a surface of said first geological body; in response to an electrical input current signal injected via electrodes into the first geological body, wherein the plurality of measurement signals are synchronised among each other;

obtaining reference signals indicative of the magnetic field strength at a location located at or adjacent the surface of the earth and located at or adjacent to a surface of a second geological body that is spaced apart from the first geological body, in response to the input current signal injected into the first geological body, wherein the reference signals are synchronized with the measurement signals; and being responsive to the measurement signals and the reference signals for deriving a transfer function for the first body, said method being for use in identifying geophysical properties below the surface of the earth;

wherein a predicted noise signal is determined by applying the transfer function to measurement signals and reference signals that are subsequently obtained in the presence of a current signal in the first geological body, where the predicted noise signal is subtracted from those subsequent measurement signals to provide corrected measurement siqnals.

* * * * *